Oct. 14, 1930.  R. H. KELLS  1,778,423
INDEX FILE
Filed Sept. 22, 1927
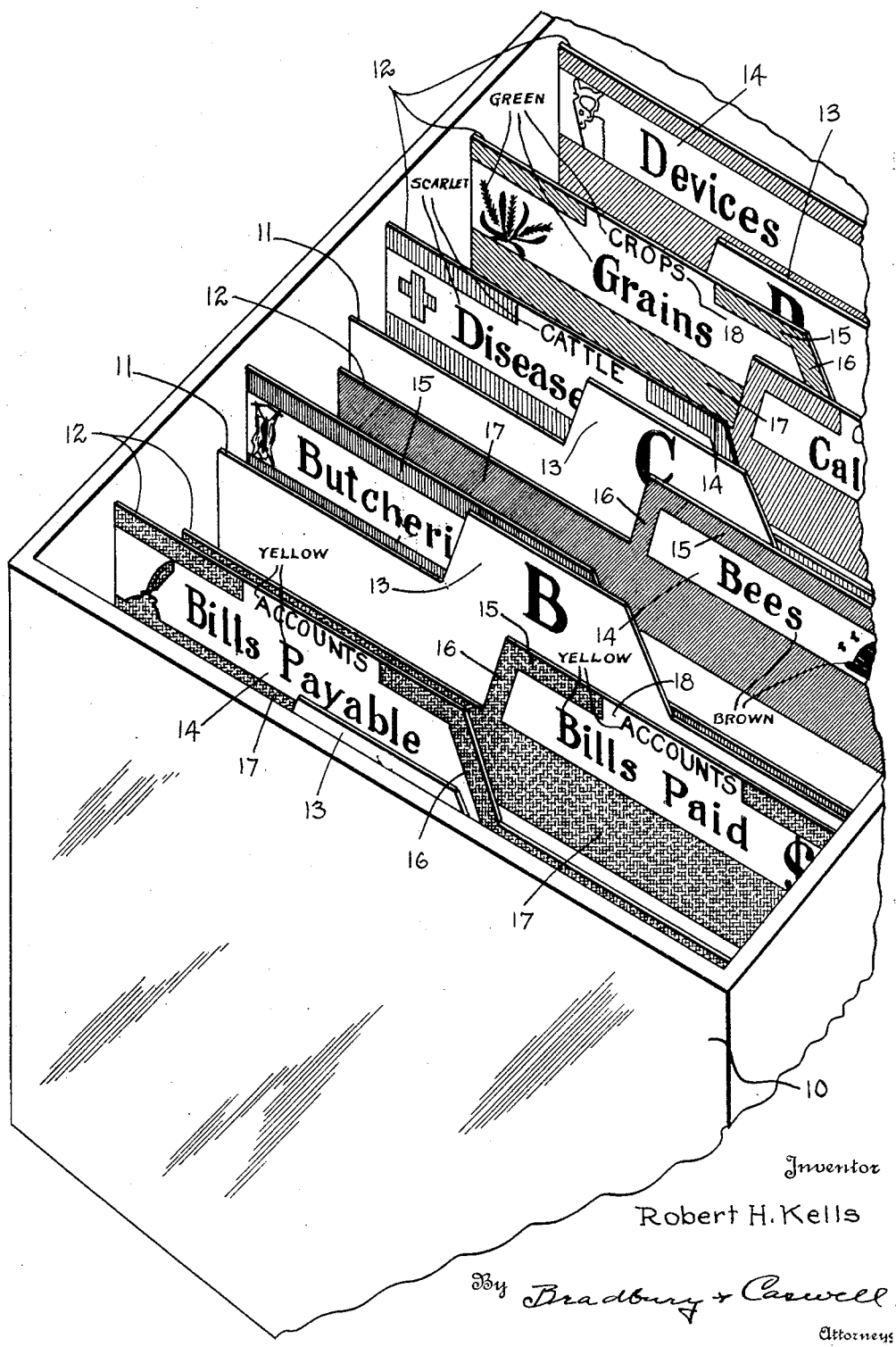
Inventor
Robert H. Kells
By Bradbury & Caswell
Attorneys Patented Oct. 14, 1930

1,778,423

UNITED STATES PATENT OFFICE

ROBERT H. KELLS, OF MINNEAPOLIS, MINNESOTA

INDEX FILE

Application filed September 22, 1927. Serial No. 221,236.

My invention relates to improvements in index files and pertains more particularly to a specialized article for use in particular vocations.

In various vocations there is available an abundance of material of informative value, such material being published from time to time in Federal and State bulletins and in many of the general and professional publications. The official bulletins appear in the forms of pamphlets and are generally confined to a single subject, although some of such bulletins, at times, are directed to topics on different subjects. The general and professional publications, of course, cover a variety of subjects. A person engaged in a business such, for example as farming, periodically receives or has available publications which he may wish to preserve, in whole or in part, to provide a source of information and reference which he can, as occasion arises, consult and thereby meet arising contingencies in the promotion of his business.

In a survey of the activities of many persons engaged in farming, it has been found that a large percentage of the farmers have preserved or intended to preserve items of information pertinent to their particular business, but almost universally it is found that such data are either lost or misplaced when they are needed, the result being that the farmer is wholly deprived of the information sought or obliged to expend a great amount of time in locating the information.

An object of my invention is to provide an improved file index constructed particularly to meet the needs of a given occupation, by means of which index, the user may assemble and safely preserve in orderly and quickly accessible manner all items of information of particular interest to himself.

More particularly it is my object to provide a device of the character described, wherein a case, adapted to receive bulletins, clippings and like sources of information, is fitted with main or alphabetical guides between which are arranged supplementary subject guides, each subject guide being marked in distinctive manners by coloring, by lettering, and by pictorial representation, which markings in combination most readily identify a particular subject guide.

A further object of the invention is to employ guides, as above, the main guides having tabs bearing letters of the alphabet and the supplementary guides having relatively offset tabs, each bearing lettering comprising a word or words constituting a subject designation and bearing a pictorial illustration appropriately corresponding with such designation and also bearing marginal borders printed in color appropriate to the subject matter indicated by said lettering and pictorial representation.

Another object of the invention resides in printing the lettering and pictorial representation on the tab of each subject guide in the same color as that employed at the margins of the tab, whereby the suggestive significance of the color employed in the marginal border is augmented by the presence of the like color in the lettering and pictorial illustration.

With the foregoing and other objects in view, which will appear in the following description, the invention resides in the novel combination and arrangement of parts and in the details of construction hereinafter described and claimed.

In the drawing, the single fragmentary perspective view illustrates an embodiment of my invention.

The embodiment of my invention portrayed in the drawing is one designed to meet the needs of the average farmer. It comprises a box or case 10 fitted with alphabetical guides 11 and subject guides 12 between which informative data may be filed and safely and conveniently preserved. These alphabetical guides 11 and subject guides 12 make it possible for the user easily and quickly to place a given item of information in the appropriate place therefor in the file at which place the user's hand may be quickly guided at any time that access to that particular item may be desired. Each alphabetical guide 11 comprises a cardboard divider having thereon a centrally disposed upwardly projecting tab 13 upon which is printed one or more of the letters of the alphabet. These guides 11 are arranged alphabetically in the case 10 as indicated in the drawing. A number of subject guides 12 are fitted into the case 10 behind each alphabetical guide. Each subject guide 12 consists of a cardboard divider having a tab 14 projecting upwardly therefrom and disposed at one side or the other of the card, the tabs of adjacent subject guides 12 being relatively offset, as shown. The tab 14 of each subject guide 12 has lettering printed thereon and consisting of a word or word identifying the subject matter intended to be designated by that particular guide and said guide is placed back of the appropriate alphabetical guide 11. For example, attention is directed to the subject guide 12 bearing the word "Bees". This guide is properly placed behind the alphabetical guide 11 marked "B" and designates the space immediately at the rear thereof, wherein subject matter concerning bees may be found or should be placed. On said tab, near said word "Bees" is a pictorial representation of a number of bees and of a bee hive. Along the upper and inner margins of said tab are border bands 15 and 16 printed in the color brown (bee brown), a lower border band 17 in like color being printed across the upper margin of the guide 12 at the side of the tab 14 and extended beneath said tab. The pictorial representation of the bees and hive and the lettering "Bees" are printed in the same bee brown color as said border bands and all of said similarly colored designating features, viz; the pictorial representation, the lettering and the bordering bands, co-operating one with the other, constitute a designative combination by which the eye of any trained or untrained user in quest of the space intended for information relative to bees may be quickly directed. A given user may or may not be adept in reading; he may or may not be quick to associate the pictorial representation of the bees and hive with the subject of bees, and he may or may not readily grasp the significance of the coloring bee brown in the lettering, representation and bordering bands as being associated with the subject of bees, but any user, however impressed with the significance of the lettering "Bees" and with the representation of the bees and hive and with the color of said lettering and representation and of the bordering bands will readily find the desired impression in the combination of said features, whereby he can quickly direct his hand to the space behind the guide embodying said features in which space items of information concerning bees are to be found or are to be placed.

Each of the subject guides 12, like the one above specifically described embodies a similar combination of features which identify the space at the back thereof as being assigned to subject matter of that import designated by said features. For further example, attention is invited to the subject guide 12 next behind the alphabetical guide 11 marked "B". This subject guide bears the word "Butchering". It also bears a pictorial representation of a butchered animal suspended in the usual manner adopted in butchering and, further, has the border lines 15, 16 and 17 thereof printed in a blood red color, which color is employed in the printing of said word "Butchering" and in the printing of said pictorial representation. From said described features embodied in said guide, it will be obvious that the eye, upon first sight of said features and by reason of the combination thereof, will instantly identify the guide, as indicating in the space therebehind, a place where subject matter concerning butchering is to be found or is intended to be placed.

It will be observed that each subject guide bears, in lettering, a word or words constituting a main title such as "Bees" or "Butchering" as hereinbefore described. Some of the subject guides 12 bear a sub-title and in such instances the main title is printed in a space, as at 18, left uncolored by a break in the upper border band 15 on the tab 14 of the guide, the sub-title being printed between the upper and lower border bands 15 and 17. An example of one of the foregoing described subject guides 12 is seen in the first subject guide shown in the case 10. This guide, next behind the first alphabetical guide marked with the letter "A" (not shown), bears the main title "Accounts" in the space 18 and the sub-title "Bills Payable" between the upper and lower border bands 15 and 17. Said guide also bears a pictorial representation of a pen and a bottle of ink in which the pen is dipped. The main title, sub-title, pictorial representation and border bands 15, 16 and 17 are all printed in a golden yellow color, said pictorial representation being indicative of bills of account to be paid and said color being indicative of gold (money) associated with the matters of account and of bills of account to be paid.

Another of the subject guides illustrated behind the first alphabetical guide 11 bears the main title "Accounts", the sub-title "Bills paid", the pictorial representation of the dollar sign, and border bands 15, 16 and 17, all in the color of gold and, in combination, plainly indicating that data relating to bills paid is to be found or should be placed in the space next behind said subject guide.

The third subject guide 12 back of the alprabetical guide 11 marked "C" bears the main title "Crops", the sub-title "Grains", the pictorial representation of growing grain, and bordering bands 15, 16 and 17, all in a grass green color and, in combination clearly indicating that data relating to crops are to be found or should be placed in the space next behind said subject guide.

The first subject guide 12 back of said alphabetical guide 11 marked "C" bears the main title "Cattle", the sub-title "Diseases" and the pictorial representation of a cross, all in red (scarlet) and in combination readily indicating that data relating to diseases of cattle is to be found or is intended to be placed in the space next behind said subject guide. Thus covering the various subjects of chief concern to a farmer, are other subject guides (not shown) appropriately placed behind the different alphabetical guides, some of which subject guides appropriately printed in color and bearing suitable pictorial representations include the following titles: Addresses, Barns, Farm houses, Silos, Cooking, Dairy, Beef cattle, Concrete, Corn, Garden devices, Entertainment, Family, Baby, Boys, Girls, Fertilizers, Flowers, Hogs, Horse, Insects, Machinery, Management, Orchards, Poultry, Turkeys, Rats, Sheep, Soils, Water systems and Weeds.

While I have illustrated an index file particularly adapted to the uses of farmers generally, it must be apparent that similar files provided particularly for other occupations will meet the various requirements thereof, as in the case particularly described herein.

My invention is particularly advantageous in that it provides a safe and convenient file for the storage of bulletins, pamphlets, clippings, etc., into and from which such data may be quickly and appropriately placed and removed not alone by literate adults, but also by children and others who have not had the advantage of an education or of training that would fit them for using a filing system more difficult to employ than my here described index file.

Changes in the specific form of my invention, as herein disclosed, may be made within the scope of what is claimed without departing from the spirit of my invention.

Having described my invention, what I claim as new and desire to protect by Letters Patent is:

1. A file of the character described comprising a case for the reception of pamphlets, clippings and the like, alphabetical guides fitted in the case, each comprising a divider card having a tab at the top thereof lettered and centrally disposed, subject guides between said alphabetical guides, each comprising a divider card having a tab at its top offset from the center thereof and bearing an upper border band, said card bearing a band extending entirely across the same beneath said tab and along the upper marginal portion of the card at the side of said tab, said upper border band having a break therein to provide a space, said tab bearing lettering in said space constituting a main title and bearing lettering and a pictorial representation beneath said upper band, each designating a like sub-title, said bands, lettering and representation being printed in a color suggestive of said sub-title.

2. In a device of the class described, a subject guide comprising a divider card bearing lettering and a pictorial representation, both in the same color, said lettering, color and representation being collectively indicative of certain subject matter.

3. In a device of the class described, a subject guide comprising a divider card bearing indicia relating to certain subject matter, said indicia appearing in a color suggestive of the same subject matter.

4. In a device of the character described, a subject guide comprising a divider bearing a color mark and also bearing lettering and a pictorial representation in the same color, the lettering and representation being both indicative of certain subject matter.

5. A file of the character described comprising a case for the reception of pamphlets, clippings and the like, guides fitted in the case and each comprising a divider card having a tab thereon, said tab bearing lettering, a pictorial representation and a color mark, the lettering, representation, and mark cooperating each with the others of the combination to designate certain subject matter.

In testimony whereof I have affixed my signature to this specification.

ROBERT H. KELLS.